United States Patent
Dunbar et al.

(10) Patent No.: US 9,967,175 B2
(45) Date of Patent: May 8, 2018

(54) RESTORING SERVICE FUNCTIONS AFTER CHANGING A SERVICE CHAIN INSTANCE PATH

(71) Applicant: Futurewei Technologies, Inc., Plano, TX (US)

(72) Inventors: Linda Dunbar, Plano, TX (US); Young Lee, Plano, TX (US); Shibi Huang, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 284 days.

(21) Appl. No.: 14/624,156

(22) Filed: Feb. 17, 2015

(65) Prior Publication Data

US 2015/0236948 A1 Aug. 20, 2015

Related U.S. Application Data

(60) Provisional application No. 61/940,308, filed on Feb. 14, 2014.

(51) Int. Cl.
*H04L 12/707* (2013.01)
(52) U.S. Cl.
CPC .................... *H04L 45/22* (2013.01)
(58) Field of Classification Search
CPC ...................................................... H04L 45/22
See application file for complete search history.

(56) References Cited

U.S. PATENT DOCUMENTS

| 2012/0176994 A1* | 7/2012 | Huang | H04L 47/122 370/329 |
| 2014/0098674 A1* | 4/2014 | Sonoda | H04L 49/3009 370/238 |
| 2014/0164617 A1* | 6/2014 | Jalan | H04L 67/1002 709/226 |

OTHER PUBLICATIONS

Justine Sherry, "Future Architectures for Middlebox Processing Services on the Internet and in the Cloud", Dec. 13, 2012.*

* cited by examiner

*Primary Examiner* — Jianye Wu
(74) *Attorney, Agent, or Firm* — Vierra Magen Marcus LLP

(57) ABSTRACT

When there is a change from a first service chain instance path to a second service chain instance path, the head-end node of the second service chain instance path is notified to include information that specifies the second service chain instance path in data packets to be routed on the second service chain instance path. That information is used to route those data packets until the nodes in the second service chain instance path complete installation of a new steering policy. When those nodes have installed the new steering policy, the information that specifies the second service chain instance path may no longer be included in data packets, and the steering policy is then used to route the data packets.

7 Claims, 8 Drawing Sheets

400

402
RECEIVE STATE INFORMATION INDICATING A SERVICE FUNCTION INSTANCE COMPONENT CANNOT BE USED; DETERMINE A NEW SERVICE CHAIN INSTANCE PATH

404
NOTIFY A HEAD-END NODE TO INCLUDE DETAILED INFORMATION ABOUT THE NEW PATH IN DATA PACKETS TO BE ROUTED ON THE NEW PATH

406
SEND A STEERING POLICY TO NODES IN THE NEW PATH

408
RECEIVE NOTICES INDICATING THAT THE STEERING POLICY IS SUCCESSFULLY INSTALLED ON THE NODES

410
NOTIFY THE HEAD-END NODE TO STOP INCLUDING DETAILED INFORMATION ABOUT THE NEW PATH IN DATA PACKETS

Fig. 4

RESTORING SERVICE FUNCTIONS AFTER CHANGING A SERVICE CHAIN INSTANCE PATH

RELATED U.S. APPLICATION

This application claims priority to U.S. Provisional Application No. 61/940,308 entitled "Service Chain Instance Path Restoration," filed on Feb. 14, 2014, hereby incorporated by reference in its entirety.

BACKGROUND

Software-defined networking (SDN) is a form of computer networking in which the control plane is decoupled from the data plane. With a separated control plane, SDN can be used to enable different types of services. Service chaining is a service in which SDN can play an important role. Traditionally, a service chain consists of a set of dedicated network service boxes such as firewalls, load balancers, and application delivery controllers that are concatenated to support a specific application. With a new service request, new devices must be installed and interconnected in a certain order. This can be a complex, time-consuming, and error-prone process, requiring careful planning of topology changes and network outages, and increasing costs.

Network Function Virtualization (NFV) is a concept that involves the implementation of network services in software that can run on a range of industry-standard high-volume servers, switches, and storage devices. With NFV, SDN can dynamically create a virtual environment for a specific service chain and eliminate the additional hardware and other issues described above.

Such services are typically implemented by the ordered combination of a number of service functions that are deployed at different points within a network. Contemporary conventional deployment models have service functions inserted on the data-forwarding path between communicating peers. However, there is movement toward a different deployment model, where selected service functions, whether physical or virtualized, do not necessarily reside on the direct data path, and instead traffic is routed through the service functions wherever they are deployed.

For a given service, the abstracted view of the required service functions and the order in which they are to be applied may be referred to as a service function chain or simply a service chain. A service chain is instantiated through selection of specific service function instance components on specific network nodes to form what may be referred to as service chain instance path. The service functions may be applied at any layer within the network protocol stack (e.g., the network layer, transport layer, application layer, etc.).

A change to an existing service chain instance path may be made because, for example, a service function instance component on a particular network node fails or loses its connection to the network, in which case a service function instance component on a different node may be substituted for the failed or lost node, essentially forming a new service chain instance path. A change to an existing service chain instance path may also be made because, for example, a service function instance component is over-utilized, in which case a higher-capacity service function instance component on a different node, or additional service function instance components on other nodes, may be substituted into or added to the existing service chain instance path, again essentially forming a new service chain instance path.

SUMMARY

In embodiments according to the present disclosure, if there is a change to a service chain instance path that involves using a different node (e.g., a change that involves using a service function instance component on a different node), then detailed information about the new service chain instance path is included in data packets (e.g., in the headers of the data packets) that are to be routed on the new path until the nodes on the new path receive and install a new steering policy. The detailed information is used by the nodes to route the data packets until the nodes on the new service chain instance path acknowledge that they have installed the new steering policy; after that, the new steering policy is used by the nodes in lieu of the detailed information, and the detailed information may no longer be included in the data packets. Thus, routing of data packets is not interrupted by changing an existing service chain instance path.

More specifically, in an embodiment, a service chain orchestration system receives notice (e.g., from a service function manager) that a service function instance component executable on node in an existing (first) service chain instance path cannot be used for some reason (e.g., it has failed or there is a connectivity failure). Consequently, the service function instance component will instead be executed by a comparable service function instance component on a different node. In an embodiment, in response to that notice, the service chain orchestration system determines a new (second) service chain instance path that includes the different node. The service chain orchestration system also notifies a node (e.g., an ingress or classifier node) at the head-end of the new (second) service chain instance path to add information that specifies the new path into the data packets (e.g., in the packet headers) that are to be routed on the new path. In an embodiment, that information includes an ordered sequence of nodes in the new path and an ordered sequence of service function instance components executed by each of the nodes in the new path. Nodes on the new path then steer or route the data packets using the information in the data packets until a new steering policy can be installed on those nodes. At some point, the nodes on the new path each notify the service chain orchestration system that the new steering policy has been installed. Once such notices have been received from all the nodes on the new path, the orchestration system notifies the aforementioned (e.g., head-end) node to stop including information about the second service chain instance path in the data packets. Instead, the data packets are routed using the new steering policy.

In an embodiment, a binary bit or flag in each of the data packets to be routed on the new service chain instance path is set to a first value to indicate that the information specifying the new service chain instance path is included in the data packets and is to be used to route the data packets (the local steering policy for the old path is to be ignored). In such an embodiment, the bit is changed to a second value to indicate that the data packets are to be routed using the new steering policy (any path information in the data packets is to be ignored).

Embodiments according to the present disclosure thus facilitate the routing of data packets when there are changes to service chain instance paths that, for example, involve replacing a service function instance component with an equivalent service function instance component on a different node. Detailed information about the new service chain instance path is included in data packets to be routed on the new path during the transition from the old path to the new path, during the period before the service chain orchestration system or controller receives confirmation from each of the involved nodes that a new steering policy has been successfully received and installed on those nodes.

Consequently, data packets can continue to be routed on the new service chain instance path using information included in the data packets until a new steering policy is put in place on each of the nodes in the new path. Thus, race conditions and synchronization issues are avoided, and it is not necessary to queue data packets while waiting for the new steering policy to be installed.

These and other objects and advantages of the various embodiments of the present disclosure will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

FIG. 4 is a flowchart of a method for restoring service functions, in an embodiment according to the present invention.

DETAILED DESCRIPTION

Figure 1A:
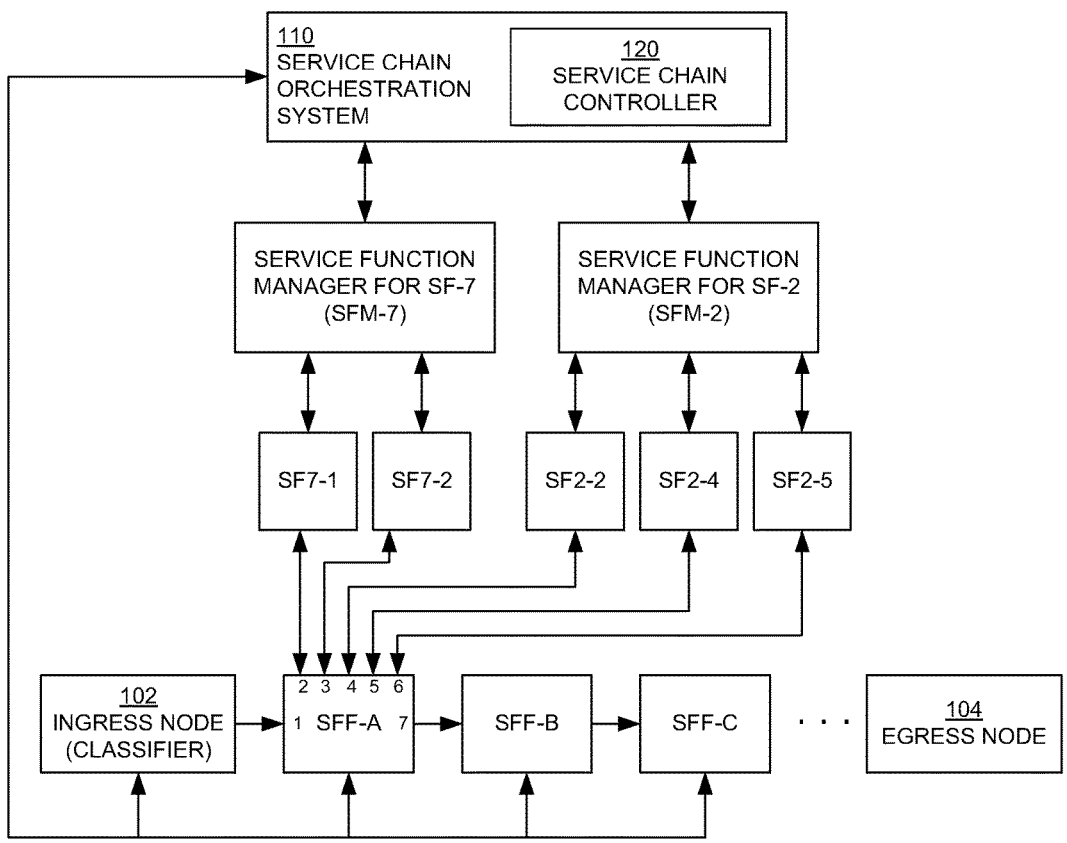
FIG. 1A is a block diagram illustrating an example of a service chain architecture in embodiments according to the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "executing," "sending," "routing," "setting," "storing," "receiving," "inserting," "determining," "signaling," or the like, refer to actions and processes (e.g., flowcharts 400, 500, 600, and 700 of FIGS. 4, 5, 6, and 7 respectively) of a computer system or similar electronic computing device or processor (e.g., the apparatus 810 of FIG. 8). A computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

A "service function," as used herein, refers to a function that is responsible for a specific type of processing of received data packets. A service function can act at the network layer or some other layer of the Open Systems Interconnection (OSI) network model. A service function can be a virtual instance or can be embedded in a physical network element. Examples of service functions include, but are not limited to: a firewall, deep packet inspection (DPI), load balancing, and network address translation (NAT).

A service function can have different service function instantiations. For example, one service function instantiation can apply a first policy set "A" (e.g., NAT-A), and another service function instantiation can apply a second policy set "B" (e.g., NAT-B). In turn, there can be multiple entities of NAT-A and multiple entities of NAT-B, each with its own capabilities (e.g., 10G capability). Each entity has its own unique address. An entity in this context is referred to herein as a "service function instance component."

A "service node" or "node" refers to a physical or virtual element that hosts one or more service functions (and therefore hosts one or more service function instance components). A "service function forwarder" (SFF) is a node that provides service-layer forwarding of data packets to a particular service function.

Identical service function instance components can be attached to different service function forwarder nodes. It is also possible to have multiple identical service function instance components attached to one service function forwarder, particularly in a network function virtualization (NFV) environment.

A sequence of service functions is referred to herein as a "service function chain" or "service chain." More specifically, a service chain defines an ordered set of service functions that are applied to the set of data packets that are to be processed using the service chain.

At the functional level, the order of service functions is important, but which service function instance component of a service function that is selected for a service chain may not be important. It is also possible that multiple service function instance components can be reached by different network nodes.

A "service chain instance path" or "service function path," as used herein, refers to the actual service function instance components selected for a particular service chain. A service chain instance path or service function path may also be referred to as a tunnel or as a rendered service path.

FIG. 1A illustrates an example of a service chain architecture that can be implemented in a software-defined network (SDN), including an NFV environment, in embodiments according to the invention. In the example of FIG. 1A, the service chain architecture includes an ingress node 102, a number of service function forwarder nodes SFF-A, SFF-B, and SFF-C, and an egress node 104. The ingress node 102 may also be referred to as a classifier node or head-end node.

There can be more or less than the three service function forwarder nodes shown in FIG. 1A. In general, a service chain architecture will include at least service nodes and service switching or forwarding nodes. A service chain architecture may also include overlay paths among the forwarding nodes; the overlay paths are for traversing network elements that are not aware of service chaining. A service chain architecture may include elements in addition to those shown or described herein.

The ingress node 102 and service function forwarder nodes SFF-A, SFF-B, and SFF-C can be implemented in a virtual network that is overlaid on a physical network. The ingress node 102 and service function forwarder nodes SFF-A, SFF-B, and SFF-C can be implemented as physical devices such as, but not limited to, servers, routers and switches.

In the example of FIG. 1A, the service function forwarder SFF-A hosts multiple service functions and multiple service function instance components of each hosted service function. For instance, the service function forwarder SFF-A hosts two service function instance components SF7-1 and SF7-2 of the service function SF7, and three service function instance components SF2-2, SF2-4, and SF2-5 of the service function SF2. Each of the service functions may be associated with a respective port on the service function forwarder node. For example, the service function SF7-1 and port 2 can be associated with one another, the service function SF7-2 and port 3 can be associated with one another, and so on. The service function forwarder SFF-A also includes an ingress port (port 1) and an egress port (port 7). In a similar manner, the service function forwarders SFF-B and SFF-C can each host multiple service functions (not shown) and multiple service function instance components of each hosted service function (not shown). Also, the same service function can be hosted on multiple service function forwarders (see the example of FIG. 2).

In the FIG. 1A embodiment, a service chain controller 120 is managed by or embedded in the service chain orchestration system 110. The service chain orchestration system 110 can be implemented on a server, and the service chain controller 120 can also be implemented on the same server or on a different server. The service chain orchestration system 110 in general, and the service chain controller 120 in particular, can create classification rules and install them on the ingress (classifier) node 102, which in turn binds incoming data packets to the service function chains implemented using the service function forwarder nodes SFF-A, SFF-B, and SFF-C. The service chain orchestration system 110 in general, and the service chain controller 120 in particular, can also create and install steering policies (e.g., routing tables or forwarding rules) on the service function forwarder nodes SFF-A, SFF-B, and SFF-C (see the example of FIG. 3).

In the FIG. 1A embodiment, one or more service function managers (SFMs) are managed by or embedded within the service chain orchestration system 110. In an embodiment, there is a service function manager for each service function. For example, there can be a service function manager SFM-7 for the service function SF7, and a service function manager SFM-2 for the service function SF2.

Figure 1B:
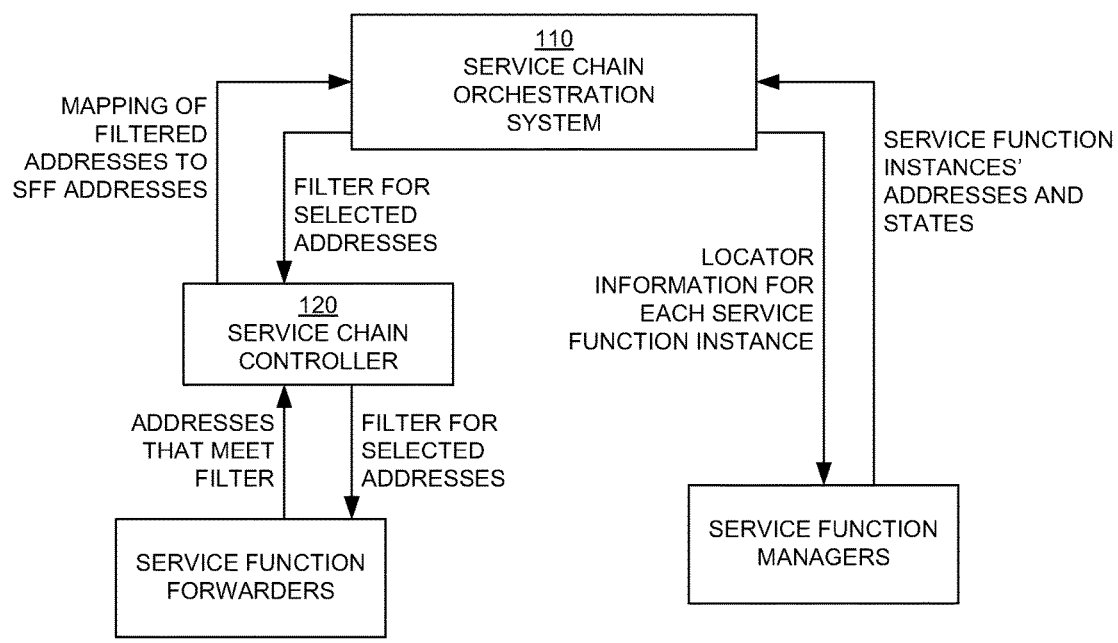
FIG. 1B is a block diagram illustrating information exchanged in a service chain architecture in an embodiment according to the invention.

Referring to FIG. 1B, the service chain orchestration system 110 can exchange messages with the service function managers and the service function forwarders regarding the status of the service functions and the service function instance components. The service function managers report the number of service function instance components, the address of each service function instance component, and the status of each service function instance component to the service chain orchestration system 110. The service chain orchestration system 110 can provide locator information for each service function instance component to the corresponding service function manager, and can set a filter for selected service function instances to the service chain controller 120, which can forward the filter to the service function forwarders; the service function forwarders can report addresses of directly attached end systems or addresses of service function instances that meet the filter to the service chain controller. The service chain controller 120 can build a mapping of filtered addresses to addresses for the service function forwarders, and can report the mapping to the service chain orchestration system. The service chain orchestration system 110 can receive notifications of changes to the service functions and service function instance components from the service function managers. For example, the service chain orchestration system 110 can receive a notification from the appropriate service function manager when a service function instance component cannot be used for some reason (e.g., due to failure or loss of connectivity). Also, for example, the service chain orchestration system 110 can receive a notification from a service function forwarder node when another service function forwarder node becomes unavailable for some reason (e.g., failure or loss of connectivity). In response to such notices, the service chain orchestration system 110 can determine a new service chain instance path and forward information about the new path to the affected nodes.

In general, the ingress (classifier) node 102 classifies the incoming traffic (data packets) and determines what service functions are to be applied to the data packets. The ingress node 102 can be implemented on a server. Once the traffic is classified, a service function chain identifier (ID) can be assigned to the traffic so that the subsequent service function forwarder nodes can more readily route the traffic. The service function chain ID can be used to identify an associated steering policy and/or can be used as an index in a routing table. Each service function chain can be distinguished using its respective ID, and so different service function chains can be performed in parallel. The egress node 104 can remove the service function chain ID before forwarding the traffic to its next destination.

Figure 2:
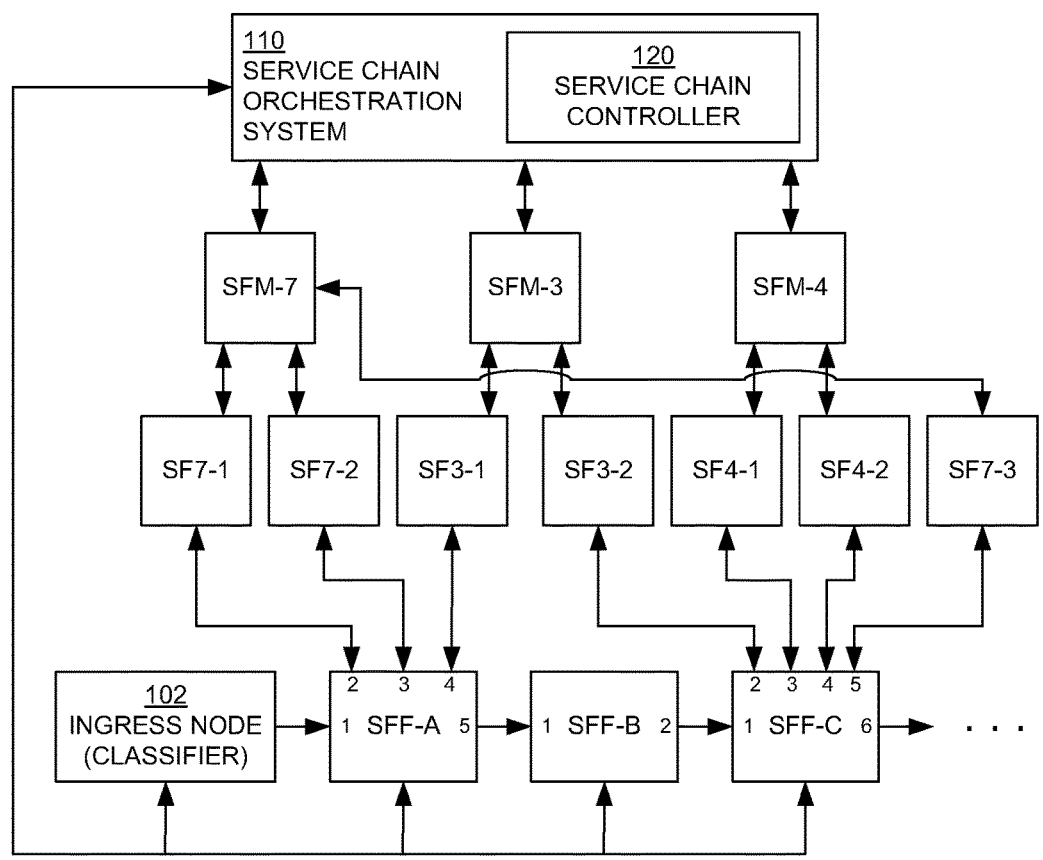
FIG. 2 is a block diagram illustrating another example of a service chain architecture in embodiments according to the invention.

FIG. 2 illustrates another example of a service chain architecture that can be implemented in an SDN, including an NFV environment, in embodiments according to the invention. In the example of FIG. 2, the service function forwarder SFF-A hosts service function instance components SF7-1 and SF7-2 of the service function SF-7 and service function instance component SF3-1 of the service function SF-3; and the service function forwarder SFF-C hosts service function instance component SF3-2 of the service function SF3, service function instance components SF4-1 and SF4-2 of the service function SF4, and service function instance component SF7-3 of the service function SF7. Thus, service function instance components of service functions SF3 and SF7 are hosted on both service function forwarders SFF-A and SFF-C.

An example of a service function chain that can be implemented in the example architecture of FIG. 2 is: service functions SF7 and SF3 at the service function forwarder SFF-A and service function SF4 at the service function forwarder SFF-C. An example of a service chain instance path in FIG. 2 is: service function instance components SF7-1 and SF3-1 at the service function forwarder SFF-A and service function instance component SF4-2 at the service function forwarder SFF-C.

An example of a service function chain implemented using the service function forwarder SFF-A and consisting of service function SF7 followed by service function SF2 is: {SF7-1, SF7-2}→{SF3-1}. The multiple service function instance components between each pair of brackets { } represents a set of equivalent or comparable service function instance components that the service function forwarder SFF-A can locally select. For example, if a service function instance component (e.g., SF7-1) on the service function forwarder SFF-A cannot be used for some reason (e.g., it has failed or connectivity to it is lost), then the service function forwarder SFF-A can make a local decision about which of the other service function instance components of the same service function is to be selected to replace the unavailable service function instance component in the service function chain. In the example of FIG. 2, the service function forwarder SFF-A can select the service function instance component SF7-2 as a replacement for SF7-1. A change from one service function instance component to another on the same node might also occur for load balancing if, for example, a particular service chain instance component is being over-utilized or under-utilized. This type of service chain restoration may be referred to as "local restoration."

There may be events or circumstances in which it is not possible to replace a service chain instance component with an equivalent service chain instance component on the same node. For example, if the service function instance component SF3-1 cannot be used for some reason, then there is not an equivalent service function instance component hosted by the service function forwarder SFF-A that can be used as its replacement. In that case, a service function instance component on a different node (e.g., the service function instance component SF3-2 on the service function forwarder SFF-C) can be inserted into the service chain as a replacement for the service function instance component SF3-1. A similar type of situation can arise if connectivity to the service function forwarder SFF-A is lost.

In embodiments according to the present disclosure, to restore service functions when there is a change to a service chain instance path that involves using a different node (e.g., that involves using a service function instance component hosted by a different service function forwarder), detailed information about the new service chain instance path is included in data packets that are to be routed on the new path until the nodes on the new path receive and install a new steering policy. The detailed information is used by the nodes to route the data packets until the nodes on the new service chain instance path acknowledge that they have installed the new steering policy; after that, the new steering policy is used by the nodes in lieu of the detailed information, and the detailed information may no longer be included in the data packets. This type of service chain restoration may be referred to as "global restoration."

In an embodiment, a steering policy for a service chain is represented as a prerequisite (match) and a corresponding destination (next hop) in the service chain path. Data packets that match or satisfy the prerequisite are routed to the corresponding destination. A steering policy may be specified at the local level or at the global level. For example, destinations included in a local steering policy may be a service function or a port or collection of ports for a service function (e.g., a collection of ports for equivalent or comparable service function instance components of the service function). Thus, a local steering policy allows a service function forwarder to choose between the equivalent or comparable service function instance components that it is hosting in order to select a service function instance component that is to perform a particular service function. For example, a local steering policy allows the service function forwarder SFF-A to choose either service function instance component SF7-1 or SF7-2 to perform service function SF7. On the other hand, destinations in a global steering policy may include a particular service function instance component or a particular port. Examples of different types of local and global steering policies are presented below based on the example of FIG. 2.

If a service chain ID for a service function chain above is "yellow," then an example of a local steering policy for the service chain instance path (SFF-A: SF7-1)→SFF-B (SFF-C: SF3-2 SF4-2) is:

| Prerequisite (Match) | Destination |
|---|---|
| ID = yellow and ingress = SFF-A port 1 | SFF-A port 2 or 3 |
| ID = yellow and ingress = SFF-A port 2 or 3 | SFF-A port 5 |
| ID = yellow and ingress = SFF-B port 1 | SFF-B port 2 |
| ID = yellow and ingress = SFF-C port 1 | SFF-C port 2 |
| ID = yellow and ingress = SFF-C port 2 | SFF-C port 3 or 4 |
| ID = yellow and ingress = SFF-C port 3 or 4 | SFF-C port 6 |

If a service chain ID for a service function chain above is "yellow," then an example of a global steering policy for the service chain instance path (SFF-A: SF7-1)→SFF-B→ (SFF-C: SF3-2→SF4-2) is:

| Prerequisite (Match) | Destination |
|---|---|
| ID = yellow and ingress = SFF-A port 1 | SFF-A port 2 |
| ID = yellow and ingress = SFF-A port 2 | SFF-A port 5 |
| ID = yellow and ingress = SFF-B port 1 | SFF-B port 2 |
| ID = yellow and ingress = SFF-C port 1 | SFF-C port 2 |
| ID = yellow and ingress = SFF-C port 2 | SFF-C port 4 |
| ID = yellow and ingress = SFF-C port 4 | SFF-C port 6 |

Note that, in the example steering policies above, it is not necessary to install the entire steering policy for the service chain ID=yellow on each of the service function forwarders. For example, only the portion of the steering policy that is relevant to the service function forwarder SFF-A may be installed on that node, only the portion of the steering policy that is relevant to the service function forwarder SFF-B may be installed on that node, and so on.

Figure 3:
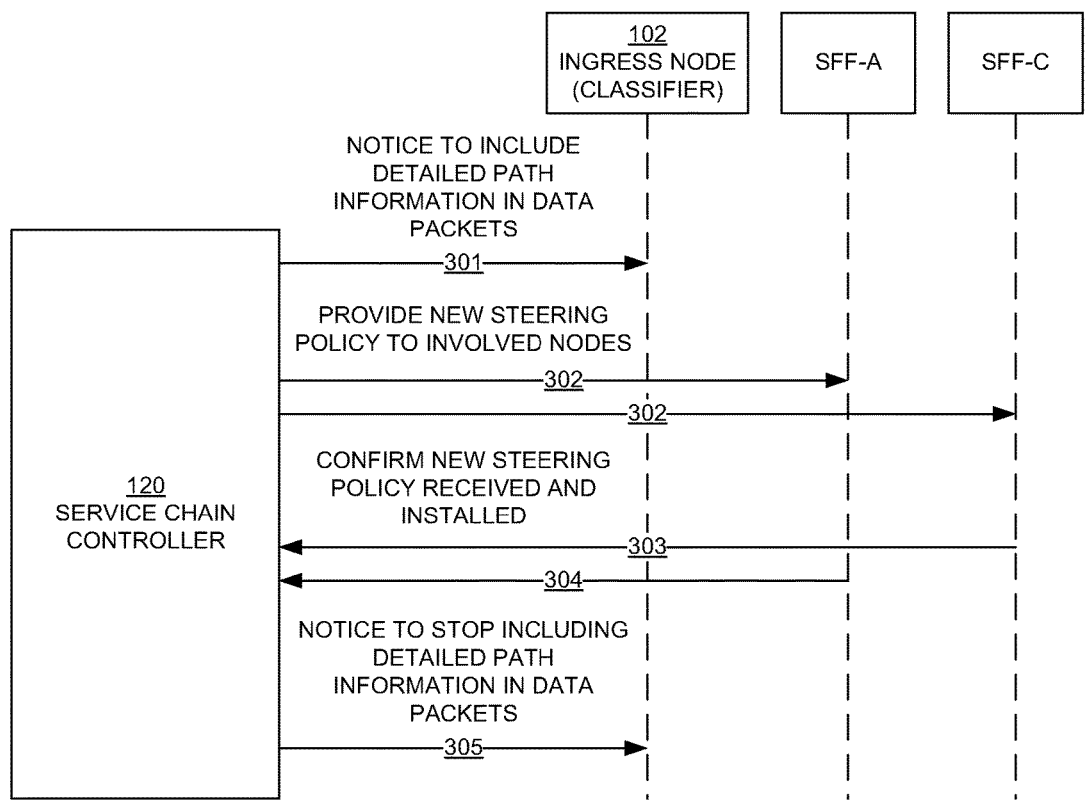
FIG. 3 illustrates an example of operations performed to restore service functions, in an embodiment according to the present invention.

FIG. 3 illustrates an example of operations performed for global restoration in order to restore service functions when there is a change to a service chain instance path that involves using a different node, in an embodiment according to the present invention. FIG. 3 is discussed in the context of the examples of FIGS. 1 and 2.

In operation 301, the orchestration system 110 in general (e.g., the service chain controller 120 in particular) receives notice that there is a change from an existing service chain instance path to a new service chain instance path. For instance, in the example of FIG. 2, the existing service chain instance path may be: service function instance components SF7-1 and SF3-1 at the service function forwarder SFF-A and service function instance component SF4-2 at the service function forwarder SFF-C. If, for example, the service function instance component SF3-1 on the service function forwarder SFF-A cannot be used for some reason, then the service function manager SFM-3 sends notice to the orchestration system 110. In response, the orchestration system 110 decides to use the service function instance component SF3-2 on the service function forwarder SFF-C as a replacement for the service function instance component SF3-1. Because this decision involves using a different node (e.g., the decision involves using an equivalent service function instance component on a different node), it also involves a change from the current service chain instance path to a new service chain instance path, and so there will also be a change to the current steering policy.

Consequently, in response to the notice from the service function manager, the orchestration system 110 determines a new service chain instance path and notifies the ingress (classifier) node 102 to include detailed information about the new path in data packets are to be routed on the new path. For example, the orchestration system 110 can send an instruction, command, or signal that includes the detailed information about the new path to the ingress node 102. In response, the ingress node 102 includes the detailed path information in data packets to be routed on the new service chain instance path. In an embodiment, the detailed information about the new service chain instance path is encoded and included in the header of each of the data packets to be routed on the new service chain instance path.

In an embodiment, the detailed information includes an ordered sequence of the service function forwarding nodes included in the new service chain instance path and an ordered sequence of the service functions performed by each of the service function forwarding nodes in the new service chain instance path. In one such embodiment, the detailed information includes an ordered sequence of the service function forwarding nodes included in the new service chain instance path and an ordered sequence of the service function instance components used by each of the service function forwarding nodes in the new service chain instance path.

In the example of FIG. 2, after substitution of service function instance component SF3-2, the new service chain instance path is: service function instance component SF7-1 at the service function forwarder SFF-A and service function instance components SF3-2 and SF4-2 at the service function forwarder SFF-C. In this example, the detailed information about the new service chain instance path that is to be encoded and included in data packets can be represented as: (SFF-A: SF7-1)→SFF-B→(SFF-C: SF3-2→SF4-2).

More specifically, in an embodiment, the following type of information can be encoded and included in data packets that are to be routed on the service chain instance path (SFF-A: SF7-1)→SFF-B (SFF-C: SF3-2→SF4-2):

| Ingress = SFF-A port 1 | Destination = SFF-A port 2 |
|---|---|
| Ingress = SFF-A port 2 | Destination = SFF-A port 5 |
| Ingress = SFF-B port 1 | Destination = SFF-B port 2 |
| Ingress = SFF-C port 1 | Destination = SFF-C port 2 |
| Ingress = SFF-C port 2 | Destination = SFF-C port 4 |
| Ingress = SFF-C port 4 | Destination = SFF-C port 6 |

In operation 302, the service chain controller 120 creates a new steering policy, and sends the new steering policy to the affected service function forwarders (e.g., SFF-A and SFF-C). Examples of local and global steering policies for the service chain instance path (SFF-A: SF7-1)→SFF-B (SFF-C: SF3-2→SF4-2) are provided above.

In operations 303 and 304, the affected service function forwarders (e.g., SFF-A and SFF-C) confirm that the new steering policy has been successfully received and installed.

In operation 305, after receiving signals from the affected service function forwarders (e.g., SFF-A and SFF-C) confirming that the new steering policy has been successfully installed, the service chain controller 120 notifies the ingress (classifier) node 102 to stop including the detailed path information in data packets. In response, the ingress node 102 stops including the detailed path information for the new service chain instance path in data packets.

FIG. 4 is a flowchart 400 of a method for restoring service functions when there is a change to a service chain instance path that involves using a different node, in an embodiment according to the present invention. In an embodiment, the operations in the flowchart 400 are performed by the service chain orchestration system 110 of FIG. 2 in general, and by the service chain controller 120 in particular.

In block 402 of FIG. 4, in an embodiment, state information about service functions executed by nodes in a network is received from, for example, service function managers. If the state information indicates that a service function instance component in a first (existing) service chain instance path cannot be used for some reason (e.g., it has failed or there is a loss of connectivity), then a second (new) service chain instance path is determined. The second service chain instance path includes a service function instance component that replaces the service function instance component that cannot be used.

In block 404, in response to the notice of block 402, a first notice (e.g., instruction, command, or signal) to include the second service chain instance path in data packets is sent. In an embodiment, the first instruction is sent to a node at the head-end of the second service chain instance path (e.g., to the ingress or classifier node 102). More specifically, in an embodiment, the first instruction includes information that specifies the second service chain instance path and instructs or notifies the node to include that information in data packets to be routed on the second service chain instance path. In an embodiment, the information specifying the second service chain instance path includes an ordered sequence of nodes in the second service chain instance path and an ordered sequence of service functions executed by each of the nodes in the second service chain instance path. In another embodiment, the information specifying the second service chain instance path includes an ordered sequence of nodes in the second service chain instance path and an ordered sequence of service function instance components executed by each of the nodes in the second service chain instance path.

In block 406, a new steering policy is sent to the nodes included in the second service chain instance path. In an embodiment, the steering policy includes a prerequisite and a corresponding destination; data packets that satisfy (e.g., match) the prerequisite are routed to the corresponding destination. The destination can include, for example, a port associated with a service function instance component, a group of ports associated with a service function, and an egress port.

In block 408, notices indicating that the steering policy is installed on the nodes included in the second service chain instance path are received from each of those nodes.

In block 410, in response to the notices of block 408, a second notice (e.g., instruction, command, or signal) is sent to the head-end node to instruct or notify the head-end node to stop including the information that specifies the second service chain instance path in data packets. Instead, the nodes in the second service chain instance path use the installed steering policy. In an embodiment, the service chain orchestration system 110 (or the service chain controller 120) of FIG. 2 waits until it has received confirmation (the notices of block 408) from all of the nodes in the second service chain instance path before sending the second notice.

Figure 5:
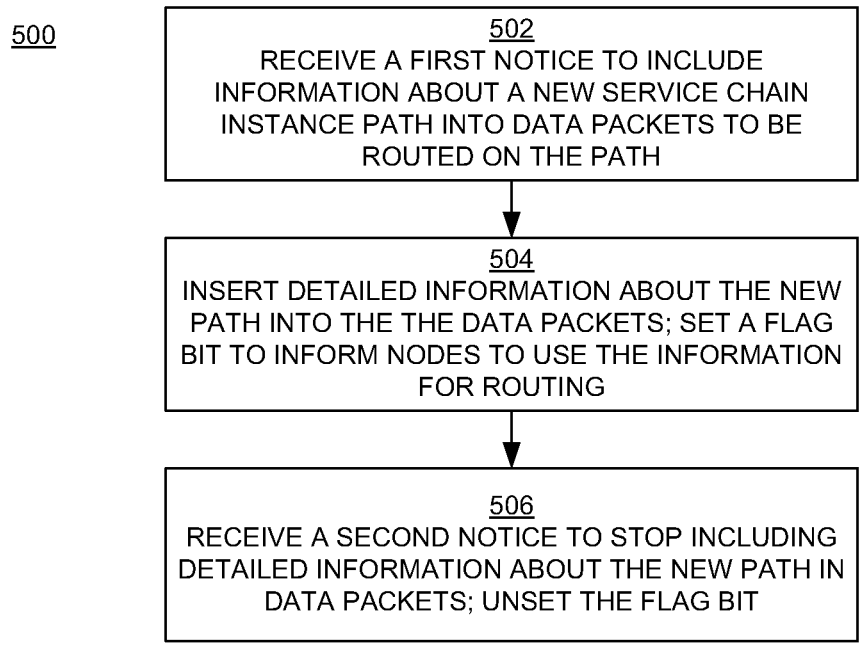
FIG. 5 is a flowchart of a method for restoring service functions, in an embodiment according to the present invention.

FIG. 5 is a flowchart 500 of a method for restoring service functions when there is a change to a service chain instance path that involves using a different node, in an embodiment according to the present invention. In an embodiment, the operations in the flowchart 500 are performed by, for example, the ingress (classifier node) 102 of FIG. 2.

In block 502 of FIG. 5, a first notice (e.g., an instruction, command, or signal) is received (e.g., from the service chain orchestration system 110 in general, or the service chain controller 120 in particular) to include detailed information that specifies a service chain instance path into data packets to be routed on the service chain instance path.

In block 504, in response, the information specifying the service chain instance path is inserted into the data packets to be routed on the service chain instance path. In an embodiment, the information is included in the headers of those data packets. In an embodiment, the information includes an ordered sequence of nodes in the service chain instance path and an ordered sequence of service functions executed by each of the nodes in the service chain instance path. In another embodiment, the information includes an ordered sequence of nodes in the second service chain instance path and an ordered sequence of service function instance components executed by each of the nodes in the second service chain instance path.

In an embodiment, a bit in each of the data packets to be routed on the service chain instance path is set to a first value (e.g., TRUE) in response to the first instruction. The first value indicates that the information specifying the service chain instance path is to be used by the service function forwarders in the service chain instance path to route the data packets.

In block 506, a second notice (e.g., an instruction, command, or signal) is received to stop including the information that specifies the service chain instance path in data packets.

In an embodiment, in response, the aforementioned bit is set to a second value (e.g., FALSE). The second value indicates that the local steering policy is to be used in lieu of the information specifying the service chain instance path (if present).

Figure 6:
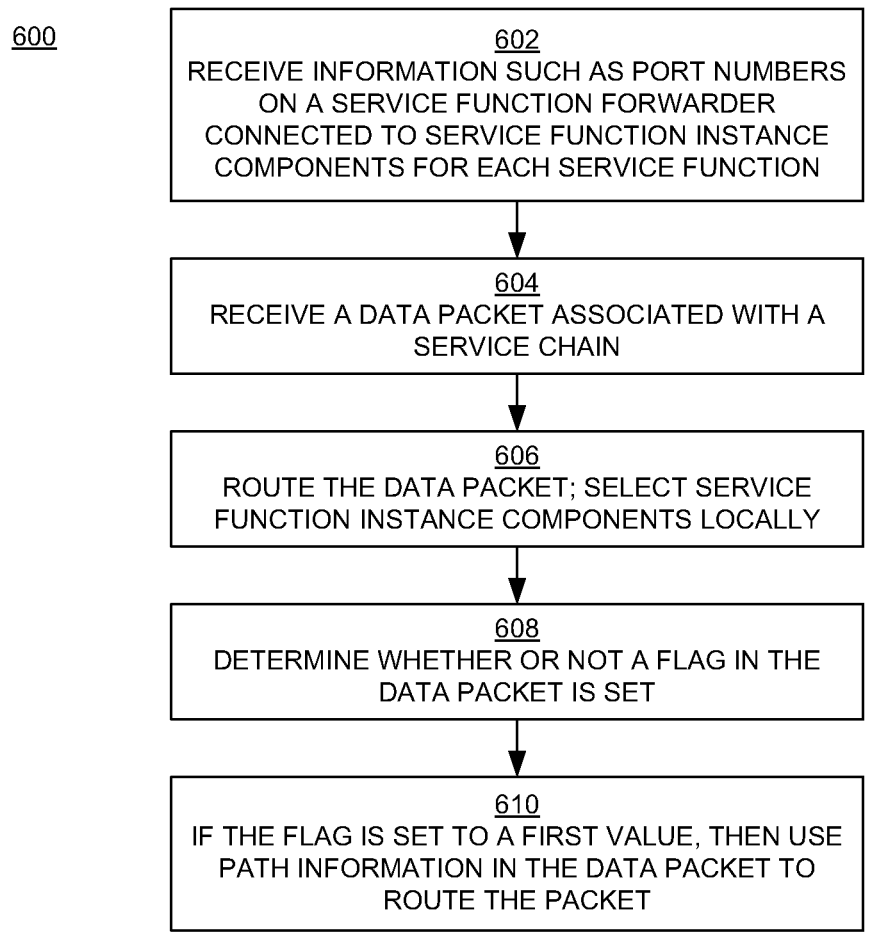
FIG. 6 is a flowchart of a method for restoring service functions, in an embodiment according to the present invention.

FIG. 6 is a flowchart 600 of a method for restoring service functions when there is a change to a service chain instance path that involves using a different node, in an embodiment according to the present invention. In an embodiment, the operations in the flowchart 600 are performed by a service function forwarder (e.g., the service function forwarder SFF-A or SFF-C) of FIG. 2.

In block 602 of FIG. 6, for each service function hosted by the service function forwarder, information including port identifiers (e.g., port numbers) for ports on the service function forwarder that are connected to service function instance components for the service function are received from a controller (e.g., from the service chain controller 120 of FIG. 2).

In block 604 of FIG. 6, a data packet having an identifier that associates the data packet with a service chain is received.

In block 606, the data packet is routed according to the local steering policy. The routing includes selecting, for each service function of the service chain, a service function instance component hosted by the service function forwarder. That is, the service function forwarder makes a local decision about which of the service function instance components for a particular service function is to be selected.

In block 608, a determination is made with regard to whether a binary bit in the data packet (e.g., in the header of the data packet) has a first value or a second value.

In block 610, if the binary bit has the first value (e.g., TRUE), then the data packet is routed according to detailed information included in the data packet and the local steering policy is to be ignored; the detailed information specifies the service chain instance path that is to be followed in lieu of the local steering policy. If the binary bit has the second value (e.g., FALSE), then the data packet is routed according to the local steering policy; the detailed path information (if present in the data packet) is to be ignored.

Another way to restore service functions when the service function path change involves multiple service function forwarding nodes is to dynamically establish a rendered service path. A "rendered service path" refers to, in general, a constrained specification of where packets that use a particular service chain are to go. For example, a rendered service path can be an ordered sequence of service functions without specifying which service function forwarders are to perform the service functions.

Figure 7:
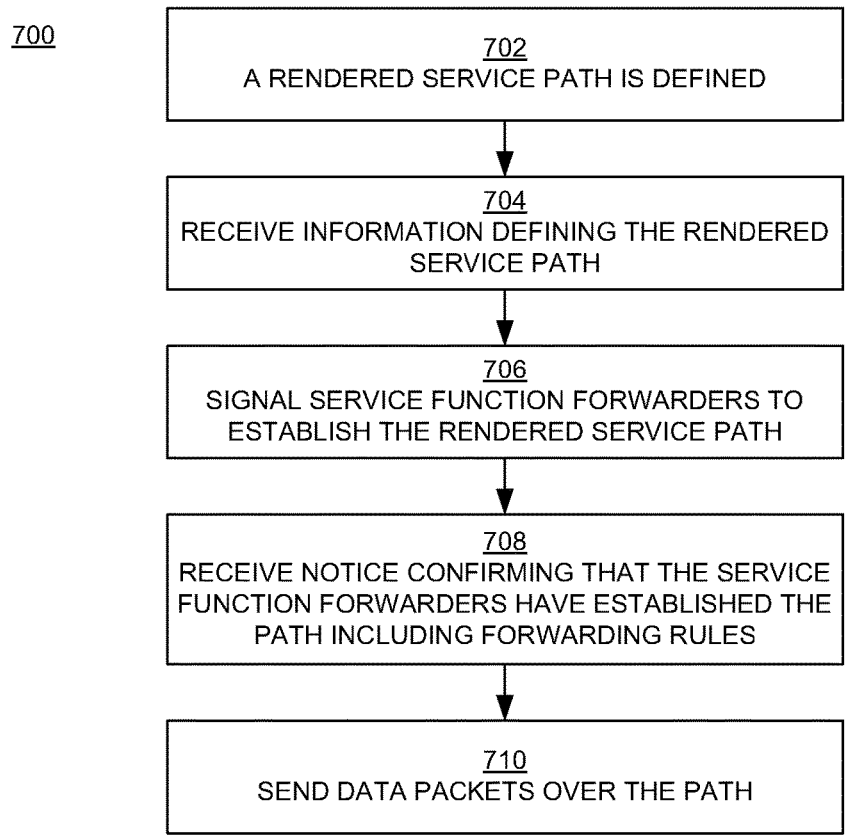
FIG. 7 is a flowchart of a method for restoring service functions when there is a change to a service chain instance path that involves using a different node, in an embodiment according to the present invention.

FIG. 7 is a flowchart 700 of a method for restoring service functions when there is a change to a service chain instance path that involves using a different node, in an embodiment according to the present invention. In an embodiment, the operations in the flowchart 700 are performed by, for example, the ingress (classifier node) 102 of FIG. 2.

In block 702 of FIG. 7, the service chain orchestration system 110 of FIG. 2 (e.g., the service chain controller 120) determines a new service chain instance path at the service function level (a rendered service path). The rendered service path includes a list of the addresses for the service function forwarders in the rendered service path; each of the service function forwarders is represented by a list of the service functions and/or service function instance components that they respectively host (by name or address).

In block 704 of FIG. 7, the ingress node 102 receives the rendered service path.

In block 706, the ingress node 102 signals the service function forwarders on the rendered service path to establish the rendered service path. In an embodiment, a signal similar to that used by the Resource Reservation Protocol—Traffic Engineering (RSVP-TE) is used to establish the rendered service path.

In response to the signal from the ingress node 102, each of the service function forwarders on the rendered service path establishes forwarding rules (e.g., steering policies, routing tables) as described previously herein to establish a tunnel for the rendered service path. For example, each service function forwarder instantiates a destination for each data packet that is part of the rendered service path (e.g., for each data packet that includes the ID for the rendered service path). The destination may be, for example, a port number for the next service function or service function instance component or the port number for the next service function forwarding node.

In block 708, the ingress node 102 receives notice that the service function forwarders on the rendered service path have each completed establishing forwarding rules and the tunnel. In an embodiment, the notice is received from the service chain orchestration system 110 of FIG. 2 (e.g., the service chain controller 120)

In block 710 of FIG. 7, in response to receiving confirmations from all of the service functioning forwarders on the rendered service path, the ingress node 102 starts sending data packets along that path.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described in FIGS. 4, 5, 6, and 7 may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

In summary, embodiments according to the present disclosure facilitate the routing of data packets when there are changes to service chain instance paths that, for example, involve using service function instance components on different nodes. Data packets can continue to be routed using information included in the data packets until a new steering policy is put in place on each of the nodes in the new service chain instance path. Thus, race conditions and synchronization issues are avoided, and it is not necessary to queue data packets while waiting for the new steering policy to be installed.

Figure 8:
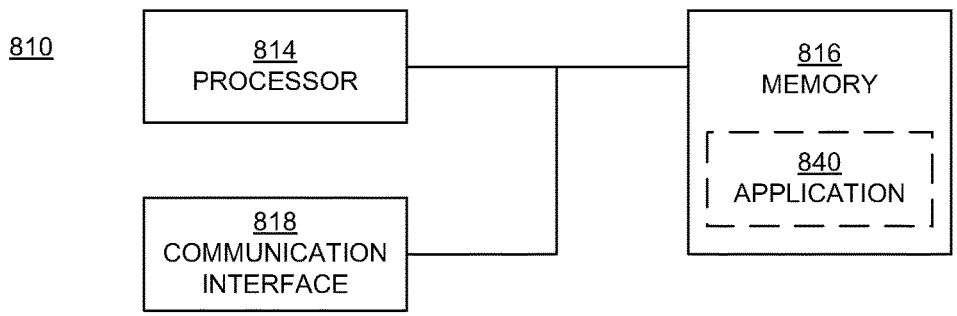
FIG. 8 is a block diagram of an example of an apparatus capable of implementing embodiments according to the present invention.

FIG. 8 is a block diagram of an example of a device or apparatus 810 capable of implementing embodiments according to the present invention. The apparatus 810 broadly includes any single or multi-processor computing device or system capable of executing computer-readable instructions, such as those described in conjunction with FIGS. 4, 5, 6, and 7. In various embodiments, the apparatus 810 is a server, a router, or a switch. As such, the apparatus 810 may be a representative embodiment of the service chain orchestration system 110, the service chain controller 120, the ingress (classification) node 102, a service function forwarder, or a service function node of FIGS. 1A, 1B, and 2.

The processor 814 of FIG. 8 generally represents any type or form of processing unit or circuit capable of processing data or interpreting and executing instructions. In certain embodiments, the processor 814 may receive instructions from a software application or module. These instructions may cause the processor 814 to perform the functions of one or more of the example embodiments described and/or illustrated herein.

The system memory 816 generally represents any type or form of volatile or non-volatile storage device or medium capable of storing data and/or other computer-readable instructions. Examples of system memory 816 include, without limitation, RAM, ROM, flash memory, or any other suitable memory device. Although not required, in certain embodiments the apparatus 810 may include a volatile memory unit in addition to a non-volatile storage unit.

The apparatus 810 may also include one or more components or elements in addition to the processor 814 and the system memory 816. For example, the apparatus 810 may include a memory device, an input/output (I/O) device, and a communication interface 818, each of which may be interconnected via a communication infrastructure.

The communication interface 818 broadly represents any type or form of communication device or adapter capable of facilitating communication (wired or wirelessly) between the apparatus 810 and one or more other devices or nodes.

The apparatus 810 can execute an application 840 that allows it to perform operations (e.g., the operations of FIG. 4, the operations of FIG. 5, the operations of FIG. 6, or the operations of FIG. 7). A computer program containing the application 840 may be loaded into the apparatus 810. For example, all or a portion of the computer program stored on a computer-readable medium may be stored in the memory 816. When executed by the processor 814, the computer program can cause the processor to perform and/or be a means for performing the functions of the example embodiments described and/or illustrated herein. Additionally or alternatively, the example embodiments described and/or illustrated herein may be implemented in firmware and/or hardware.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosed disclosure.

What is claimed is:

1. An apparatus, comprising:
   a communication interface communicating with nodes in a network;
   one or more processors coupled to the communication interface; and
   a non-transitory memory storage coupled to the one or more processors, the non-transitory memory storage including computer-executable instructions that, when executed by the one or more processors, cause the apparatus to:
   receive state information for service functions executable by the nodes;
   when the state information indicates that a service function instance component in a first service chain instance path cannot be used, determine a second service chain instance path that includes a replacement for the service function instance component;
   send a steering policy to nodes included in the second service chain instance path, wherein data packets are to be routed on the second service chain instance path based on the steering policy, and notify a node at the head-end of the second service chain instance path to include information about the second service chain instance path in the data packets; and
   after steering policy is installed on nodes included in the second service chain instance path, notify the node at the head-end of the second service chain instance path to stop including the information about the second service chain instance path in the data packets.

2. The apparatus of claim 1, wherein the instructions, when executed by the one or more processors, further cause the apparatus to:
   notify the node at the head-end of the second service chain instance path to encode the information about the second service chain instance path and set a flag in the headers of the data packets to be routed on the second service chain instance path, the flag indicating that the information about the second service chain instance path included in the data packets is to be used to route the data packets; and
   after the steering policy is installed on nodes included in the second service chain instance path, notify the node at the head-end of the second service chain instance path to unset the flag, indicating that the steering policy is to be used to route the data packets.

3. The apparatus of claim 1, wherein the instructions, when executed by the one or more processors, further cause the apparatus to wait to notify the node at the head-end of the second service chain instance path to stop including the information about the second service chain instance path in data packets until after each of the nodes included in the second service chain instance path confirms that the steering policy has been installed.

4. The apparatus of claim 1, wherein the information about the second service chain instance path included in the data packets comprises an ordered sequence of nodes in the second service chain instance path and an ordered sequence of service function instance components executed by the nodes in the second service chain instance path.

5. The apparatus of claim 1, wherein the steering policy comprises a prerequisite and a corresponding destination, wherein data packets that satisfy the prerequisite are routed to the corresponding destination.

6. The apparatus of claim 5, wherein the corresponding destination is selected from the group consisting of:
   a port associated with a service function instance component;
   a group of ports associated with a service function; and
   an egress port.

7. The apparatus of claim 1, wherein the instructions, when executed by the one or more processors, further cause the apparatus to:
   receive, from a service function manager, addresses for the service function instance components in a pool of service function instance components managed by the service function manager;
   provide locator information for the service function instance components to the service function manager;
   determine a filter for selected addresses and sending the filter to the nodes;
   receive addresses for service function instance components that satisfy the filter; and
   map the addresses that satisfy the filter to the nodes.

* * * * *